United States Patent
Kim et al.

(10) Patent No.: US 7,965,792 B2
(45) Date of Patent: Jun. 21, 2011

(54) MODULATION-INDEX ADJUSTABLE AMPLITUDE SHIFT KEYING TRANSMITTER

(75) Inventors: Tae Jin Kim, Seoul (KR); Kyoo Hyun Lim, Yongin-si (KR)

(73) Assignee: FCI, Inc., Seongnam-si, Gyeonggi-do (KR)

( * ) Notice: Subject to any disclaimer, the term of this patent is extended or adjusted under 35 U.S.C. 154(b) by 753 days.

(21) Appl. No.: 11/952,543

(22) Filed: Dec. 7, 2007

(65) Prior Publication Data

US 2008/0137774 A1    Jun. 12, 2008

(30) Foreign Application Priority Data

Dec. 8, 2006    (KR) .................. 10-2006-0124199

(51) Int. Cl.
*H04L 27/04*    (2006.01)
(52) U.S. Cl. .................. 375/300; 375/146; 375/268

(58) Field of Classification Search .................. 375/300, 375/268, 146; 332/120; 327/149
See application file for complete search history.

(56) References Cited

U.S. PATENT DOCUMENTS

| | | | | |
|---|---|---|---|---|
| 6,670,836 B1* | 12/2003 | Zivanovic | | 327/170 |
| 7,515,832 B2* | 4/2009 | Kikuchi | | 398/161 |
| 2006/0256964 A1* | 11/2006 | Gu et al. | | 380/242 |
| 2007/0253468 A1* | 11/2007 | Pettersen et al. | | 375/146 |

* cited by examiner

*Primary Examiner* — Shuwang Liu
*Assistant Examiner* — Dhaval Patel

(57) ABSTRACT

Provided is a modulation-index adjustable amplitude shift keying (ASK) transmitter including: a bias current supply unit supplying one or more bias currents in response to a digital signal that is to be transmitted and one or more bias current control signals; and a modulation signal generator generating a modulation signal corresponding to the digital signal by modulating a carrier signal in response to the one or more bias currents.

13 Claims, 3 Drawing Sheets

MODULATION-INDEX ADJUSTABLE AMPLITUDE SHIFT KEYING TRANSMITTER

CROSS-REFERENCE TO RELATED PATENT APPLICATION

This application claims the benefit of Korean Patent Application No. 10-2006-0124199, filed on Dec. 8, 2006, in the Korean Intellectual Property Office, the disclosure of which is incorporated herein in its entirety by reference.

BACKGROUND OF THE INVENTION

1. Field of the Invention

The present invention relates to an analog transmitter, and more particularly, to an amplitude shift keying (ASK) transmitter.

2. Description of the Related Art

Amplitude shift keying (ASK) is a modulation scheme in which an amplitude of a carrier wave varies according to digital signal information. For example, in the modulation scheme, in order to modulate a binary digital signal, a carrier wave having a predetermined level of the amplitude is transmitted when the digital signal has a value of 1, and transmission of the carrier wave is suspended when the digital signal has a value of 0. The ASK modulation scheme in which the carrier wave is present (ON) or absent (OFF) is called an on-off keying (OOK) modulation scheme.

A modulation index in a frequency modulation scheme is one of the most important electric characteristics to determine performances of a transmitter and a receiver along with a modulation factor in an amplitude modulation scheme. The modulation factor is defined as a ratio m/M of an amplitude m of a signal wave to be transmitted to an amplitude M of a carrier wave in amplitude modulation. Here, the amplitude M of the carrier wave means an amplitude of the carrier wave that is not modulated yet. The ratio m/M expressed as a percentage refers to a modulation rate. The modulation index in the frequency modulation scheme corresponds to the modulation factor in the amplitude modulation scheme and represents a degree or efficiency of modulation. As the modulation index decreases, carrier wave power (energy) increases, and modulated wave power (energy) decreases. Here, the modulation index and the modulation factor are used as the same.

FIG. 1 illustrates an amplitude modulation (AM) waveform when the modulation index m is 0.5 (referred to as 50%).

FIG. 2 illustrates an AM waveform when the modulation index m is 1 (referred to as 100%).

FIG. 3 illustrates an AM waveform when the modulation index m is greater than 1.

Referring to FIGS. 1 to 3, it can be seen that the modulation index m having a value of slightly smaller than 1 (referred to as 100%) is relatively effective.

However, the value of the modulation index is determined differently according to a communication system using the transmitter and the receiver, so that an optimal modulation index cannot be fixed. The value of the modulation index is determined when the transmitter and the receiver are manufactured and cannot be arbitrarily changed by a user. Therefore, there is a problem in that the transmitter and the receiver that are manufactured to be used for a particular communication system cannot be used for another communication system having different electric characteristics.

SUMMARY OF THE INVENTION

The present invention provides a modulation-index adjustable amplitude shift keying (ASK) transmitter.

According to an aspect of the present invention, there is provided a modulation-index ASK transmitter including: a bias current supply unit supplying one or more bias currents in response to a digital signal that is to be transmitted and one or more bias current control signals; and a modulation signal generator generating a modulation signal corresponding to the digital signal by modulating a carrier signal in response to the one or more bias currents.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the attached drawings.

Figure 1:
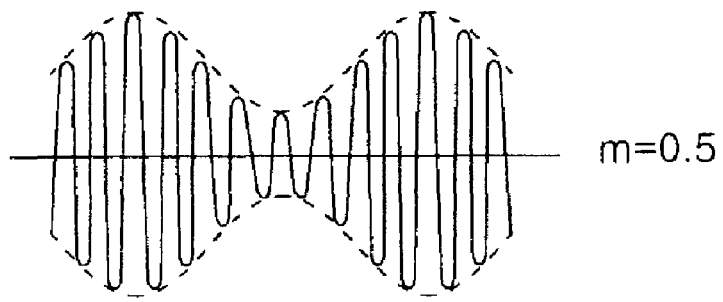
FIG. 1 illustrates an amplitude modulation (AM) waveform when a modulation index m is 0.5 (referred to as 50%)
Figure 2:
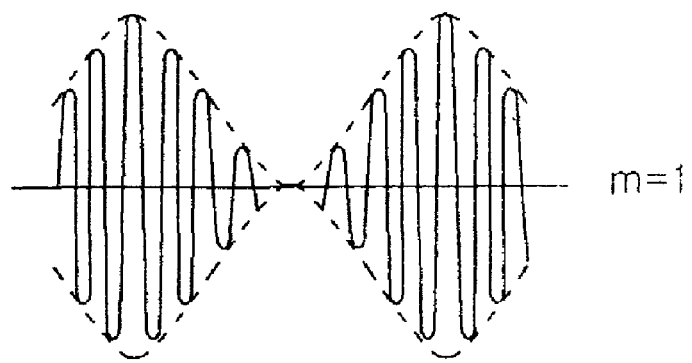
FIG. 2 illustrates an AM waveform when a modulation index m is 1 (referred to as 100%)
Figure 3:
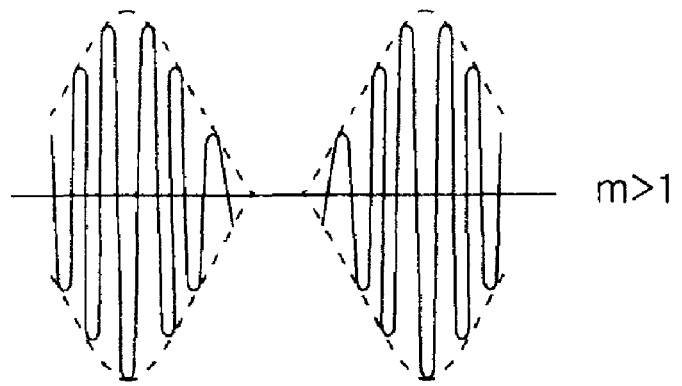
FIG. 3 illustrates an AM waveform when a modulation index m is greater than 1.
Figure 4:
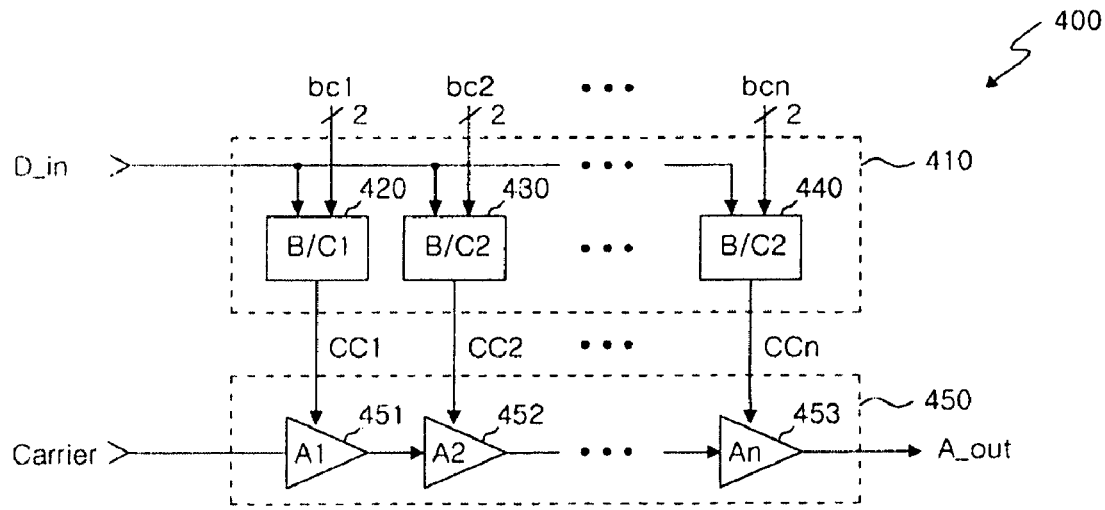
FIG. 4 is a block diagram illustrating a modulation-index adjustable amplitude shift keying (ASK) transmitter according to the present invention.

FIG. 4 is a block diagram illustrating a modulation-index adjustable amplitude shift keying (ASK) transmitter according to the present invention.

Referring to FIG. 4, the modulation-index adjustable ASK transmitter 400 includes a bias current supply unit 410 and a modulation signal generator 450.

The bias current supply unit 410 includes one or more bias current supply circuits 420 to 440 for supplying one or more bias currents cc1 to ccn in response to a digital signal D_in that is to be transmitted and one or more bias current control signals bc1 to bcn.

The first bias current supply circuit 420 generates the first bias current cc1 in response to the digital signal D_in and the first bias current control signal bc1. The second bias current supply circuit 430 generates the second bias current cc2 in response to the digital signal D_in and the second bias current control signal bc2. The n-th bias current supply circuit 440 generates the n-th bias current ccn in response to the digital signal D_in and the n-th bias current control signal bcn.

Here, each of the bias current control signals bc1 to bcn represents two or more different control signals. Specifically, the first bias current control signal bc1 includes a rising edge control signal bc1_1 for determining a rising edge transition time of a modulation signal A_out and a falling edge control signal bc1_2 for determining a falling edge transition time of the modulation signal A_out.

The modulation signal generator 450 includes one or more signal processing units 451 to 453 for generating the modulation signal A_out corresponding to the digital signal D_in by modulating a carrier signal Carrier in response to the one or more bias currents cc1 to ccn.

The first signal processing unit 451 performs buffering on the carrier signal Carrier in response to the first bias current cc1. The second signal processing unit 452 performs buffering on the signal output from the first signal processing unit 451 in response to the second bias current cc2. The n-th signal processing unit 453 performs buffering on the signal output from the second signal processing unit 452 in response to the n-th bias current ccn. The first to n-th signal processing units 451 to 453 may be implemented by using buffers connected in series. Each of the signal processing units 451 to 453 generates an output signal corresponding to an input signal applied to each of the signal processing units 451 to 453 after a predetermined time delay. The predetermined time delay is called a response delay of the signal processing unit.

Each of the bias currents cc1 to ccn adjusts the response delay of the output signal with respect to the input signal of a corresponding signal processing unit 451 to 453 to finally determine the rising edge or the falling edge of the modulation signal A_out.

Figure 5:
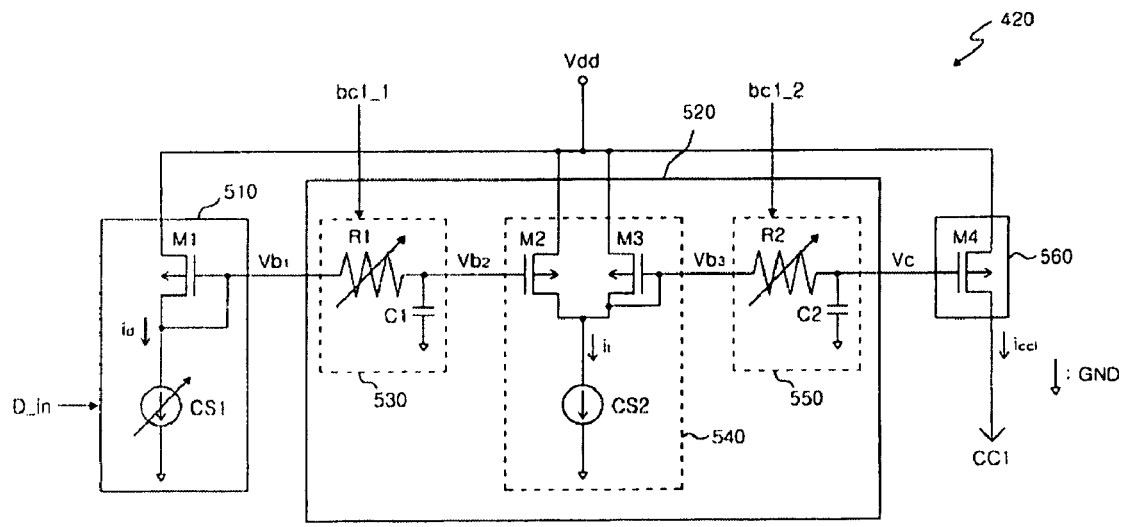
FIG. 5 is an internal circuit diagram of a first bias current supply circuit illustrated in FIG. 4.

FIG. 5 is an internal circuit diagram of the first bias current supply circuit 420 illustrated in FIG. 4.

Referring to FIG. 5, the first bias current supply circuit 420 includes a reference bias supply circuit 510, a bias current control circuit 520, and a bias current output circuit 560.

The reference bias supply circuit 510 includes a first metal-oxide-semiconductor (MOS) transistor M1 and a first current source CS1 to generate a first reference bias voltage $V_{b1}$ in response to the digital signal D_in. The first MOS transistor M1 includes a terminal connected to a first source voltage $V_{dd}$, the other terminal, and a gate terminal to generate the first reference bias voltage $V_{b1}$. The first current source CS1 includes a terminal connected to a node for generating the first reference bias voltage $V_{b1}$ and the other terminal connected to a second source voltage GND. Here, the first current source CS1 is a variable current source for sinking a current of which a value is changed according to the digital signal D_in.

The bias current control signal 520 generates a bias control voltage $V_c$ in response to the first reference bias voltage $V_{b1}$, the falling edge control signal bc1_1, and the rising edge control signal bc1_2 and includes a falling edge adjustment circuit 530, a bias changing block 540, and a rising edge adjustment circuit 550. As described above, the rising edge control signal bc1_1 and the falling edge control signal bc1_2 are obtained from the first bias current control signal bc1.

The falling edge adjustment circuit 530 includes a first resistor R1 and a first capacitor C1 to generate a second reference bias voltage $V_{b2}$ by delaying the first reference bias voltage $V_{b1}$ for a predetermined time in response to the falling edge control signal bc1_1. The first resistor R1 includes a terminal connected to the first reference bias voltage $V_{b1}$ and has a resistance value that is changed in response to the falling edge control signal bc1_1. The first capacitor C1 includes a terminal connected to the other terminal of the first resistor R1 to generate the second reference bias voltage $V_{b2}$ and the other terminal connected to the second source voltage.

The bias changing block 540 includes a second MOS transistor M2, a third MOS transistor M3, and a second current source CS2 to generate a third reference bias voltage $V_{b3}$ corresponding to the second reference bias voltage $V_{b2}$. The second MOS transistor M2 includes a terminal connected to the first source voltage and a gate terminal applied with the second reference bias voltage $V_{b2}$. The third MOS transistor M3 includes a terminal connected to the first source voltage, the other terminal, and a gate terminal to generate the third reference bias voltage $V_{b3}$. The second current source CS2 is a static current source that can flow a constant current $i_t$, including a terminal connected to a node for generating the third reference bias voltage $V_{b3}$ and the other terminal connected to the second source voltage.

The rising edge adjustment circuit 550 includes a second resistor R2 and a second capacitor C2 to generate the bias control voltage $V_c$ by delaying the third reference bias voltage $V_{b3}$ for a predetermined time in response to the rising edge control signal bc1_2. The second resistor R2 includes a terminal connected to the third reference bias voltage $V_{b3}$ and has a resistance value that is changed in response to the rising edge control signal bc1_2. The second capacitor C2 includes a terminal connected to the other terminal of the second resistor R2 to generate the bias control voltage $V_c$ and the other terminal connected to the second source voltage.

The bias current output circuit 560 generates the bias current cc1 in response to the bias control voltage $V_c$. The bias current output circuit 560 may be implemented by using a fourth MOS transistor that includes a terminal connected to the first source voltage, generates a bias current $i_{cc1}$ corresponding to the bias control voltage $V_c$ applied to a gate terminal thereof, and outputs the bias current $i_{cc1}$ through the other terminal thereof.

Here, the falling edge adjustment circuit 530 and the rising edge adjustment circuit 550 have the same structure as that of a low pass filter. However, the structures of the falling edge adjustment circuit 530 and the rising edge adjustment circuit 550 are not limited to the structure of low pass filter and may be modified in various forms.

Hereinafter, operations of the transmitter illustrated in FIGS. 4 and 5 and a method of adjusting the modulation index will be described.

First, transmission of an analog modulation signal according to a state of the digital signal D_in input to the transmitter is described.

The first reference bias voltage $V_{b1}$ is determined by the current source CS1 for sinking a current id of which a value is changed according to the digital signal D_in. The first and second MOS transistors M1 and M2 have a form of a current mirror regardless of the first resistor R1 disposed therebetween, so that a value of a current flowing to the second MOS transistor M2 is determined by the first reference bias voltage $V_{b1}$ applied to the gate terminal thereof. Here, if the first and second MOS transistors M1 and M2 have the same electric characteristics, the value of the current flowing to the second MOS transistor M2 is the same as that of the current $i_d$ flowing through the first MOS transistor M1.

A common terminal of the second and third MOS transistors M2 and M3 is connected to the second current source CS2, and the current $i_t$ flowing through the second current source CS2 that is the static current source is fixed.

Since the sum of currents supplied from the second and third MOS transistors M2 and M3 is the total amount of current $i_t$ that can be supplied to the second current source CS2, the current flowing through the third MOS transistor M3 is obtained by subtracting the current $i_d$ flowing through the second MOS transistor M2 from the total amount of current $i_t$. The third and fourth MOS transistors M3 and M4 also have a form of a current mirror regardless of the second resistor R2 disposed therebetween, so that the current $i_{cc1}$ flowing through the fourth MOS transistor M4 is the same as the current $i_t$-$i_d$ flowing through the third MOS transistor M3 if the third and fourth MOS transistors have the same electric characteristics.

When the bias current $i_{cc1}$ flowing through the fourth MOS transistor M4 increases, a gain of the first signal processing unit 451 that can be implemented as a buffer increases, and the carrier signal Carrier is normally buffered to be output. In other words, the analog modulation signal A_out can be normally transmitted. On the other hand, when the third reference bias voltage $V_{b3}$ decreases, the bias current $i_{cc1}$ generated from the fourth MOS transistor M4 decreases.

Relationships between the currents flowing at each stage of the first bias current supply circuit 420 illustrated in FIG. 5 may be represented by Equation 1.

$$i_t = i_d + i_{cc1}$$ [Equation 1]

Referring to Equation. 1, since the current $i_t$ flowing to the second current source CS2 is fixed, when the current $i_d$ flowing through the first current source CS1 and the current $i_t$ flowing through the second current source CS2 are adjusted to be simultaneously the same (referred to as $i_d \approx i_t$), the bias current $i_{cc1}$ can be minimized (referred to as $i_t - i_d$). On the other hand, when the current $i_d$ flowing through the first current source CS1 is adjusted to be substantially zero, the bias current $i_{cc1}$ can be maximized (referred to as $i_t$).

Accordingly, when the digital signal D_in has a value of 1, the current $i_d$ flowing through the first current source CS1 is adjusted to be substantially zero so that the current $i_{cc1}$ flowing through the fourth MOS transistor M4 can be maximized (referred to as $i_t$). When the digital signal D_in has a value of 0, the current $i_t$ flowing through the first current source CS1 and the current $i_d$ flowing the second current source CS2 are controlled to be the same to decrease the current $i_{cc1}$ flowing through the fourth MOS transistor M4. The modulation signal generator 450 generates the modulation signal corresponding to the changed current $i_{cc1}$.

Hereinafter, changes in a waveform of the analog modulation signal A_out to adjust the modulation index are described.

Adjusting the gain of the first signal processing unit 451 by adjusting the first bias current $i_{cc1}$ is described in advance. In addition, a waveform of the analog modulation signal A_out can be changed by changing a time to adjust the first bias current $i_{cc1}$.

As described above, the first bias current control signal bc1 includes the falling edge control signal bc1_1 and the rising edge control signal bc1_2, and the two control signals bc1_1 and bc1_2 are used to change the resistance values of the variable resistors R1 and R2. Referring to FIG. 5, the falling edge adjustment circuit 530 and the rising edge adjustment circuit 550 have the same structure as that of the low pass filter. Therefore, changes in the resistance values affect response speeds of the output voltages $V_{b2}$ and $V_c$ with respect to the input voltages $V_{b1}$ and $V_{b3}$. The delay characteristics result in a change of the first bias current $i_{cc1}$.

In other words, since the gain of the first signal processing unit 451 for generating the analog modulation signal A_out corresponding to the digital D_in gradually increases or gradually decreases, a strength of the analog modulation signal A_out is changed.

At a falling edge of a signal transiting from a logic high state to a logic low state, the digital signal D_in has a value of 0, so that the current $i_d$ flowing through the first current source CS1 abruptly increases, and thus the first reference bias voltage $V_{b1}$ decreases. Here, the falling edge adjustment circuit 530 generates the second reference bias voltage $V_{b2}$ obtained by delaying the first reference bias voltage $V_{b1}$ for a predetermined time. The first and second MOS transistors M1 and M2 form the current mirror, and the third and fourth MOS transistors M3 and M4 also form the current mirror. Therefore, as the current $i_d$ flowing through the first MOS transistor M1 increases, the current flowing through the second MOS transistor M2 increases, and a change in currents flowing through the third and fourth MOS transistors M3 and M4 occurs, the change corresponding to the current $i_t - i_d$ calculated by subtracting the current $i_d$ flowing through the second MOS transistor M2 from the total current $i_t$ that may flow through the second current source CS2. The change in currents affects the falling edge of the analog modulation signal A_out. As described above, the falling edge adjustment circuit 530 generates the second reference bias voltage $V_{b2}$ by delaying the first reference bias voltage $V_{b1}$ for a predetermined time in response to the falling edge control signal bc1_1 and can adjust a decrease of the current flowing through the fourth MOS transistor M4 by using the bias control voltage $V_c$ that is changed according to the second reference bias voltage $V_{b2}$.

At a rising edge of a signal transiting from the logic low state to the logic high state, the digital signal D_in has a value of 1, so that the current $i_d$ flowing through the first current source CS1 abruptly becomes substantially zero. Here, the flow of the current $i_d$ flowing through the falling edge adjustment circuit 530 is temporarily suspended, so that the time delay is not affected. However, as the first reference bias voltage $V_{b1}$ increases, the second bias voltage $V_{b2}$ also increases. Since the first and second MOS transistors M1 and M2 form the current mirror, the current flowing through the second MOS transistor becomes substantially zero. Therefore, the current flowing through the third MOS transistor M3 is substantially the same as the current $i_t$ flowing through the second current source CS2. In addition, since the third and fourth MOS transistors M3 and M4 form the current mirror, the current $i_{cc1}$ flowing through the fourth MOS transistor M4 is the same as the current $i_t$ flowing through the third MOS transistor M3. However, the current flowing through the fourth MOS transistor M4 is adjusted by the bias control signal $V_c$, and the bias control voltage $V_c$ is generated when the third reference bias voltage $V_{b3}$ flows through the rising edge adjustment circuit 550. As described above, the rising edge adjustment circuit 550 generates the bias control signal $V_c$ by delaying the third reference bias voltage $V_{b3}$ for a predetermined time in response to the rising edge control signal bc1_2 and can adjust the increased current by using the change in the bias control voltage $V_c$.

Figure 6:
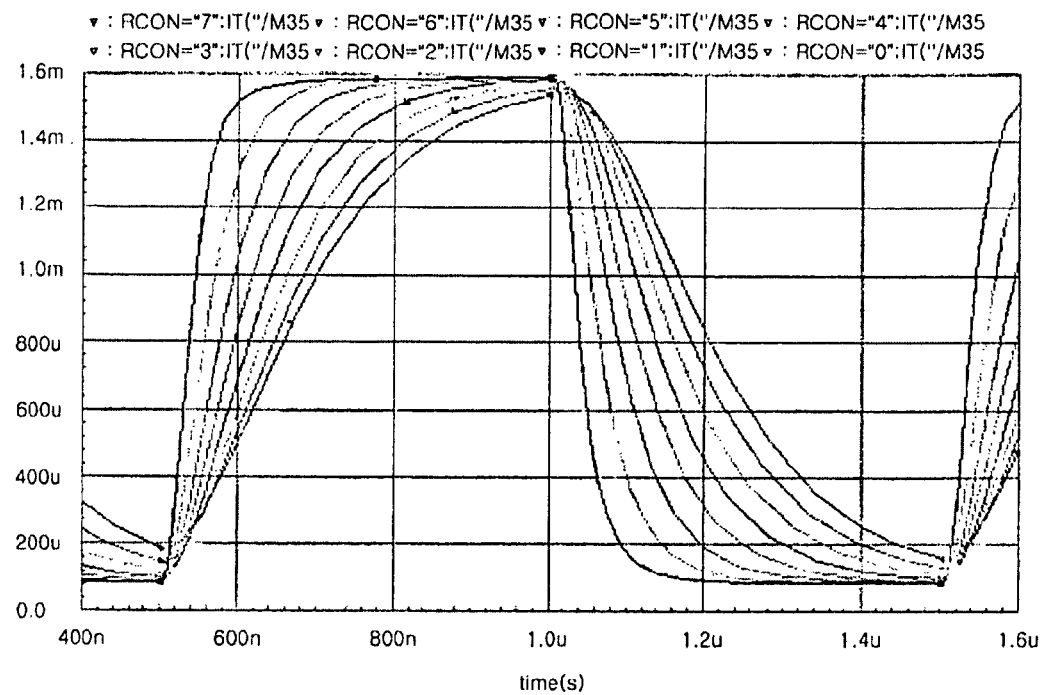
FIG. 6 illustrates changes in a waveform of the analog modulation signal that is changed according to resistance values of variable resistors.

FIG. 6 illustrates changes in a waveform of the analog modulation signal A_out that is changed according to resistance values of variable resistors.

Referring to FIG. 6, as the resistance values are changed, the analog modulation signal A_out is changed from a rectangular waveform to a saw-tooth waveform. Energy of the rectangular waveform and energy of the saw-tooth waveform are different from each other, so that it is apparent that values of modulation indices thereof are changed.

According to the present invention, the transmitter that can adaptively change the modulation index according to an environment of the system by changing the resistance values is provided.

Figure 7:
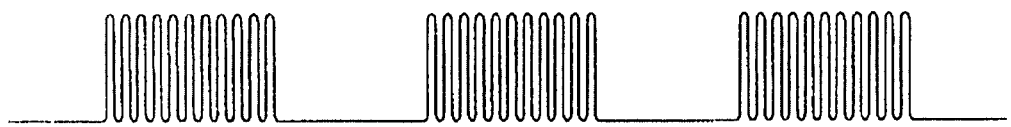
FIGS. 7 to 9 illustrate examples of analog modulation signals having different modulation indices output from the transmitter according to the present invention.
Figure 8:
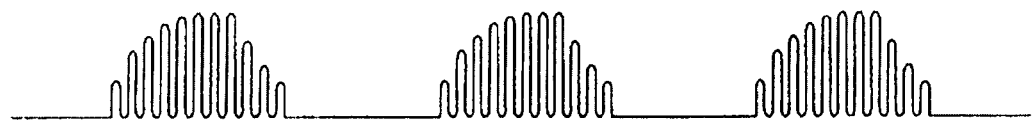
Figure 9:
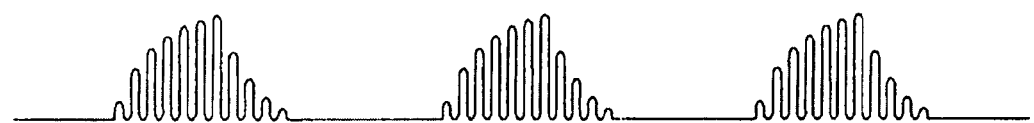

FIGS. 7 to 9 illustrate examples of the analog modulation signals A_out having different modulation indices output from the transmitter according to the present invention.

As described above, the modulation-index adjustable ASK transmitter according to the present invention has an advantage of generating a transmission signal having a desired modulation index by directly adjusting a modulation waveform in an analog transmitter performing ASK modulation.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A modulation-index adjustable ASK (amplitude shift keying) transmitter comprising:
a bias current supply unit supplying one or more bias currents in response to a digital signal that is to be transmitted and one or more bias current control signals; and
a modulation signal generator generating a modulation signal corresponding to the digital signal by modulating a carrier signal in response to the one or more bias currents,
wherein each of the one or more bias current control signals includes a falling edge control signal for determining a falling edge transition time of the modulation signal and a rising edge control signal for determining a rising edge transition time of the modulation signal, and the bias current supply unit comprises one or more bias current supply circuits for generating the bias currents in response to the digital signal and the bias current control signals; and
wherein the bias current supply circuit comprises:
a reference bias supply circuit supplying a first reference bias voltage in response to the digital signal;
a bias current control circuit generating a bias control voltage in response to the first reference bias voltage, the rising edge control signal, and the falling edge control signal; and
a bias current output circuit generating the bias current in response to the bias control voltage.

2. The ASK transmitter of claim 1, wherein the modulation signal generator comprises one or more signal processing units for modulating the carrier signal in response to the bias currents.

3. The ASK transmitter of claim 2, wherein each of the one or more signal processing units includes a buffer.

4. The ASK transmitter of claim 2, wherein the bias current changes electric characteristics of each of the one or more signal processing units.

5. The ASK transmitter of claim 4, wherein the electric characteristics of each of the one or more signal processing units is a response delay of an output signal with respect to an input signal of each of the one or more signal processing units.

6. The ASK transmitter of claim 1, wherein the reference bias supply circuit comprises:
a first MOS (metal-oxide-semiconductor) transistor including a terminal connected to a first source voltage, the other terminal, and a gate terminal to generate the first reference bias voltage; and
a first current source including a terminal connected to a node for generating the first reference bias voltage and the other terminal connected to a second source voltage to adjust a current flowing in response to the digital signal.

7. The ASK transmitter of claim 1, wherein the bias current control circuit comprises:
a falling edge control circuit generating a second reference bias voltage by delaying the first reference bias voltage in response to the falling edge adjustment signal;
a bias changing block generating a third bias voltage corresponding to the second reference bias voltage; and
a rising edge adjustment circuit generating the bias control voltage by delaying the third reference bias voltage for a predetermined time in response to the rising edge control signal.

8. The ASK transmitter of claim 7, wherein the falling edge adjustment circuit comprises:
a first resistor including a terminal connected to the first reference bias voltage and has a resistance value that is changed in response to the falling edge control signal; and
a first capacitor including a terminal connected to the other terminal of the first resistor to generate the second reference bias voltage and the other terminal connected to the second source voltage.

9. The ASK transmitter of claim 7, wherein the bias changing block comprises:
a second MOS transistor including a terminal connected to the first source voltage and a gate terminal applied with the second reference bias voltage;
a third MOS transistor including a terminal connected to the first source voltage, the other terminal, and a gate terminal to generate the third reference bias voltage; and
a second current source including a terminal connected to a node for generating the third reference bias voltage and the other terminal connected to the second source voltage.

10. The ASK transmitter of claim 9, wherein the second current source is a static current source for sinking a current of which a value is fixed.

11. The ASK transmitter of claim 8, wherein the rising edge adjustment circuit comprises:
a second resistor including a terminal connected to the third reference bias voltage and has a resistance value that is changed in response to the rising edge control signal; and
a second capacitor including a terminal connected to the other terminal of the second resistor to generate the bias control voltage and the other terminal connected to the second source voltage.

12. The ASK transmitter of claim 10, wherein the bias current output circuit comprises a fourth MOS transistor which includes a terminal connected to the first source voltage, generates the bias current corresponding to the bias control voltage applied to a gate terminal thereof, and outputs the bias current through the other terminal thereof.

13. The ASK transmitter of claim 12, wherein a type of the third or fourth MOS transistor is a p-type MOS transistor or an n-type MOS transistor, and the types of the third and fourth MOS transistors are different from each other.

* * * * *